United States Patent
Koskey

(10) Patent No.: US 10,440,937 B2
(45) Date of Patent: Oct. 15, 2019

(54) WINDOW PLAY TOY FOR CATS AND PETS

(71) Applicant: James Donald Koskey, Manitou Springs, CO (US)

(72) Inventor: James Donald Koskey, Manitou Springs, CO (US)

(73) Assignee: K & H Manufacturing, LLC, Colorado Springs, CO (US)

( * ) Notice: Subject to any disclaimer, the term of this patent is extended or adjusted under 35 U.S.C. 154(b) by 0 days.

(21) Appl. No.: 15/219,508

(22) Filed: Jul. 26, 2016

(65) Prior Publication Data

US 2018/0077903 A1    Mar. 22, 2018

(51) Int. Cl.
*A01K 15/02* (2006.01)
*F16B 47/00* (2006.01)

(52) U.S. Cl.
CPC ............ *A01K 15/025* (2013.01); *F16B 47/00* (2013.01)

(58) Field of Classification Search
CPC .................................................... A01K 15/025
USPC ................................................. 119/707, 702
See application file for complete search history.

(56) References Cited

U.S. PATENT DOCUMENTS

| | | | | |
|---|---|---|---|---|
| 5,540,187 A | * | 7/1996 | Udelle | A01K 15/025 119/706 |
| 5,544,623 A | * | 8/1996 | Udelle | A01K 15/025 119/706 |
| 5,572,955 A | * | 11/1996 | Boshears | A01K 15/025 119/706 |
| 5,673,651 A | * | 10/1997 | Udelle | A01K 15/025 119/706 |
| 5,785,005 A | * | 7/1998 | Udelle | A01K 15/025 119/706 |
| 5,924,908 A | * | 7/1999 | O'Heir | A63H 33/00 119/707 |
| 6,032,615 A | * | 3/2000 | Girard | A01K 15/025 119/707 |
| 2006/0054105 A1 | * | 3/2006 | Renforth | A01K 15/025 119/708 |
| 2009/0095229 A1 | * | 4/2009 | Plante | A01K 15/025 119/707 |
| 2009/0308328 A1 | * | 12/2009 | Kellogg | A01K 15/025 119/706 |
| 2012/0272921 A1 | * | 11/2012 | Santarsiero | A01K 15/025 119/707 |
| 2016/0242388 A1 | * | 8/2016 | Chiou | A01K 15/024 |

* cited by examiner

*Primary Examiner* — Trinh T Nguyen
(74) *Attorney, Agent, or Firm* — Ice Miller LLP

(57) ABSTRACT

A window play toy for cats and pets has a plastic housing with an elongated curvilinear interior space. The plastic housing has a number of openings. A first pinching slot is attached to the first end of the plastic housing and a second pinching slot is attached to the second end of the plastic housing. A pair of suction cups engage the pair of pinching slots. A ball engages the curvilinear interior space and is trapped between the window and the plastic housing. In one case, the housing is attached to window using an adhesive tape and in this case no pinching slots are required.

5 Claims, 3 Drawing Sheets

WINDOW PLAY TOY FOR CATS AND PETS

RELATED APPLICATIONS

None

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Cats are curious animals and love to bat at things. A number of toys have been produced to entertain cats such as soft balls attached to a string which is connected to a rod that can be held by the owner or mounted to say a window sill. However if the owner has to hold the rod and cause the ball to dance, they soon become bored with the game or have other things they need to do. If the rod is mounted and the ball is static, the cat quickly becomes bored and does not play with the toy. A number of solutions have been proposed to solve this problem where the ball or toy is moved by some sort of motor. Unfortunately, these are expensive to produce, take up a lot of room both in shipping and in the customer's home, and are prone to breaking.

Thus there exists a need for a simple, inexpensive, space efficient cat toy that keeps cats and other pets engaged.

BRIEF SUMMARY OF INVENTION

A window play toy for cats and pets that overcomes these and other problems has a plastic housing with an elongated curvilinear interior space. The plastic housing has a plurality of openings. A first pinching slot is attached to the first end of the plastic housing and a second pinching slot is attached to the second end of the plastic housing. A pair of suction cups each have a nipple that engages a pinching slot. A ball engages the curvilinear interior space and is trapped between the window and the plastic housing. In one embodiment, the housing is attached to a window using an adhesive tape and in this embodiment no pinching slots are required.

This device provides endless fun for cats as the ball traverses along the path and can be reached only through certain slots. The curves provide a random motion that cats are attracted to and eliminates the need for a motor to animate the ball. The device is compact and inexpensive making it ideal for cat owners.

DETAILED DESCRIPTION OF THE INVENTION

The present invention relates to a window play toy for cats and pets that has a plastic housing with an elongated curvilinear interior space. The plastic housing has a number of openings. A first pinching slot is attached to the first end of the plastic housing and a second pinching slot is attached to the second end of the plastic housing. A pair of suction cups is attached to the pinching slots by nipples that engage the slots. A ball engages the curvilinear interior space and is trapped between the window and the plastic housing. In one embodiment, the housing is attached to a window using an adhesive tape and in this embodiment no pinching slots are required.

This device provides endless fun for cats as the ball traverses along the path and can be reached only through certain slots. The curves provide a random motion that cats are attracted to and eliminates the need for a motor to animate the ball. The device is compact and inexpensive making ideal for cat owners.

Figure 1:
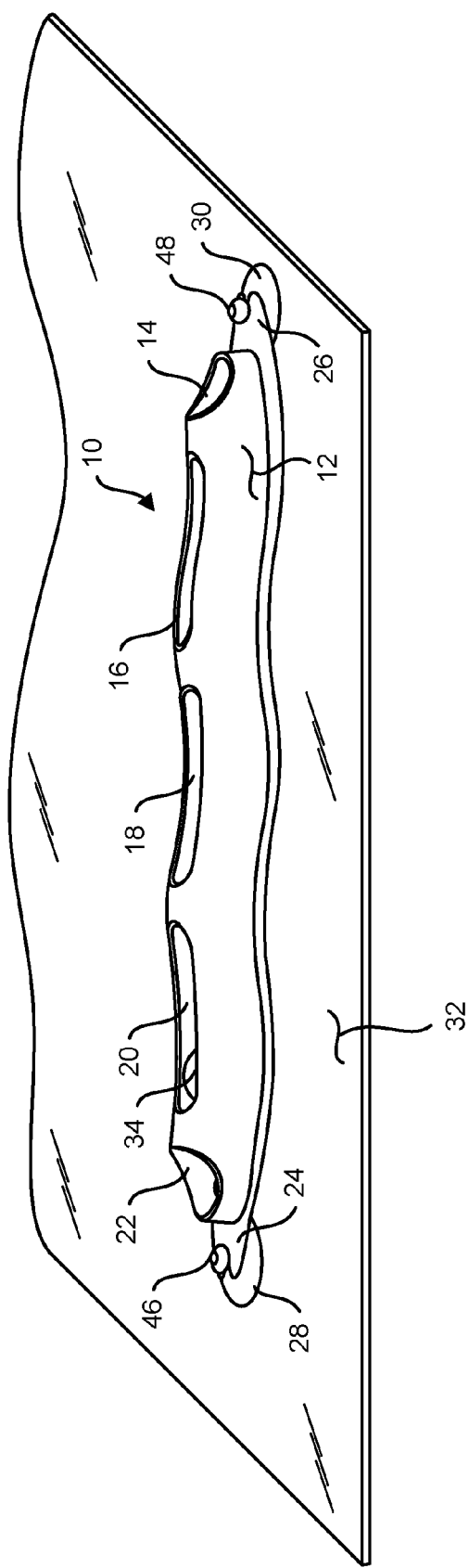
FIG. 1 is a side, top, perspective view of a window play toy for cats and pets, in accordance with one embodiment of the invention.

FIG. 1 is a side, top, perspective view of a window play toy for cats and pets 10 in accordance with one embodiment of the invention. The play toy 10 has a housing (or partial channel) 12 having a plurality of slots 14, 16, 18, 20, 22. The housing 12 has a first end 24 and a second end 26. A pair of attachment devices 28, 30 is connected to the first end 24 and the second end 26. The pair of attachment devices 28, 30 are detachably connected to a flat surface, such as a window 32 or a refrigerator door. The attachment devices 28, 30 are shown as suction cups, however other attachment devices may be used without departing from the scope of the invention. A ball 34 fits between the housing 12 and the glass 32. A cat or other pet can bat the ball 34 through one of the slots 14, 16, 18, 20, 22 causing it to run along the channel.

Figure 2:
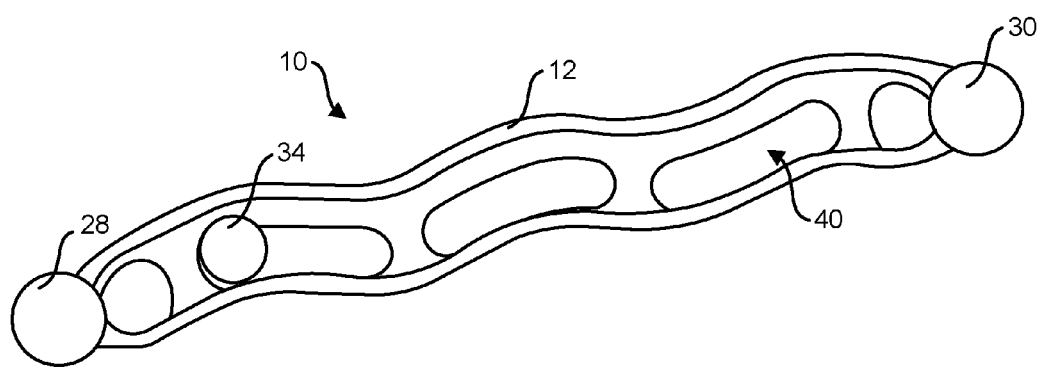
FIG. 2 is a bottom view of a window play toy for cats and pets, in accordance with one embodiment of the invention.

FIG. 2 is a bottom view of a window play toy for cats and pets 10 in accordance with one embodiment of the invention. This view shows that the elongated curvilinear interior space 40 forms a partial channel for the ball 34. It is clear that housing 12 bends and this enhance the erraticness of the motion of the ball, which keeps the cat's attention.

Figure 3:
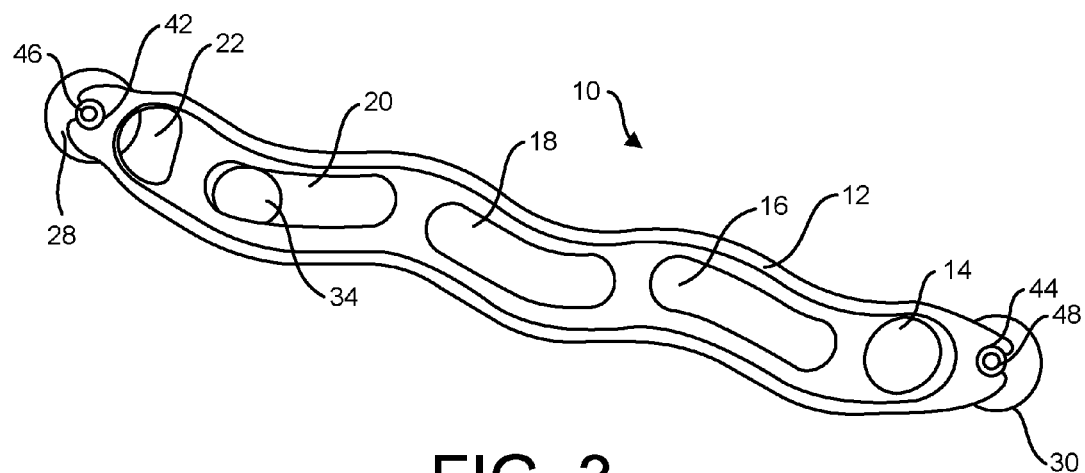
FIG. 3 is a top view of a window play toy for cats and pets, in accordance with one embodiment of the invention.

FIG. 3 is a top view of a window play toy for cats and pets 10 in accordance with one embodiment of the invention. This figure shows the first pinching slot 42 and the second pinching slot 44 that engage the nipples 46, 48 of the suction cups 28, 30.

Figure 4:
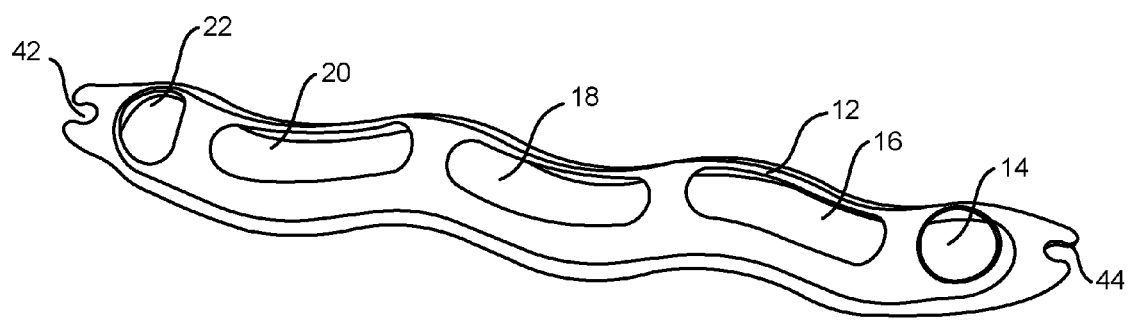
FIG. 4 is a is a side, top, perspective view of a housing for a window play toy for cats and pets, in accordance with one embodiment of the invention.

FIG. 4 is a is a side, top, perspective view of a housing 12 for a window play toy for cats and pets, in accordance with one embodiment of the invention. In this view you can see the pinching slots 42, 44 more clearly.

Figure 5:
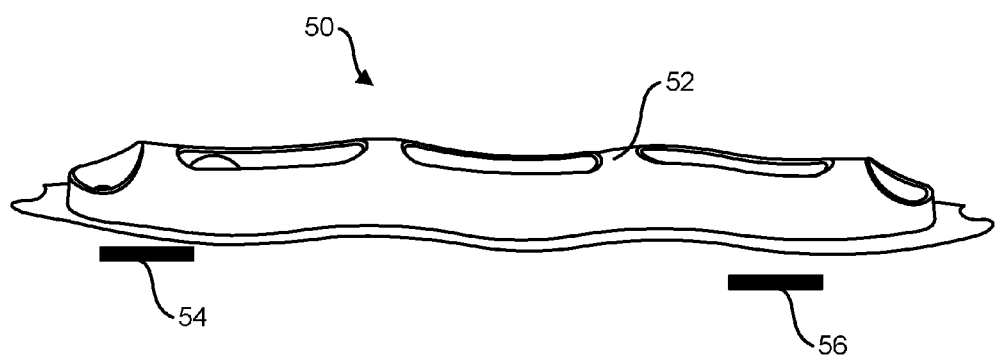
FIG. 5 is a side, top, perspective view of a window play toy for cats and pets, in accordance with one embodiment of the invention.

FIG. 5 is a side, top, perspective view of a window play toy for cats and pets 50 in accordance with one embodiment of the invention. This embodiment is just like the embodiment in FIG. 1 except that the suction cups and pinching slots have been replaced by adhesive strips 54, 56. The adhesive strips 54, 56 are double sided and detachably attach to the housing 52 or to a window or other flat surface. Note the adhesive strips may be similar to Command strips sold by 3M. In another embodiment the adhesive strip may be replaced with hook and loop strips. Commonly the toy 10 is mounted roughly horizontally on a window which allows the cat access to the slots 14, 16, 18, 20, 22 and allows the ball to roll easily from one end to the other end of the toy.

Thus there has be described a toy that provides endless fun for cats as the ball traverses along the path and can be reached only through certain slots. The curves provide a random motion that cats are attracted to and eliminates the need for a motor to animate the ball. The device is compact and inexpensive making ideal for cat owners.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A window play toy for pets, comprising:
   a singular plastic housing;
   a pair of attachment devices;
   a partial channel having a plurality of random bends along a length of the singular plastic housing and a first end attached to one of the attachment devices and a second end attached to a second of the attachment devices, wherein the each of the attachment devices are suction cups;
   a ball engaging a concave side of the partial channel wherein the pair of attachment devices are attached to a flat surface;
   a first pinching slot attached to the first end of the partial channel and a second pinching slot attached to the second end of the partial channel, wherein a nipple of a first suction cup engages the first pinching slot and a nipple of a second suction cup engages the second pinching slot;
   wherein the concave side of the partial channel and the flat surface form a complete channel that holds the ball.

2. The window play toy for pets of claim 1, wherein the partial channel has a number of openings.

3. The window play toy for pets of claim 1, wherein the pair of attachment devices are adhesive strips.

4. The window play toy for pets of claim 1, wherein the flat surface is a window.

5. A window play toy for cats, comprising:
   a plastic housing having an elongated curvilinear interior space, wherein the plastic housing has a plurality of openings;
   a first pinching slot attached to the first end of the plastic housing and a second pinching slot attached to the second end of the plastic housing;
   a pair of suction cups, each of the pair of suction cup having a nipple that engages the first pinching slot;
   a ball engaging the curvilinear interior space; and
   wherein the ball is trapped between the window and the plastic housing.

* * * * *